(No Model.)
L. HERWEYER.
BARBED WIRE FENCE.
No. 517,548. Patented Apr. 3, 1894.
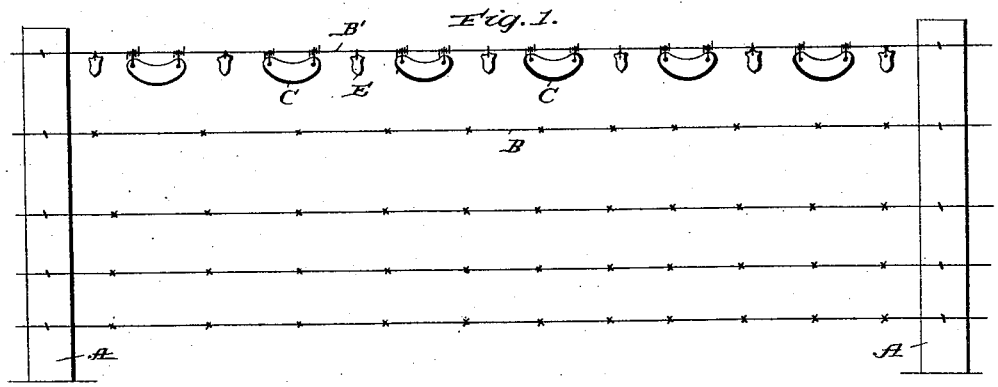
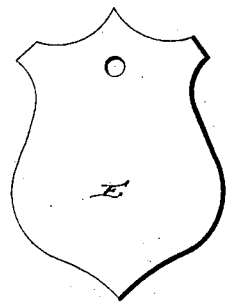
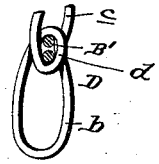
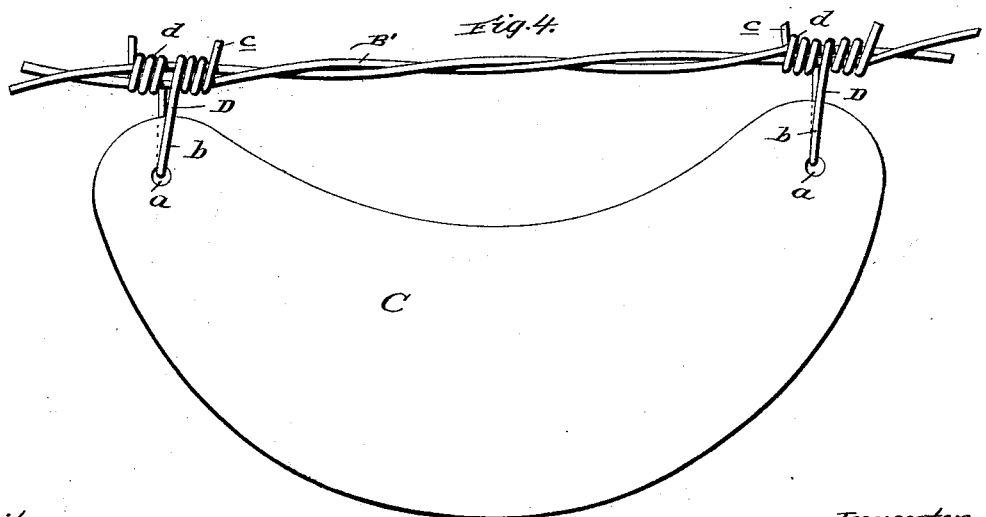
Witnesses:
C. H. Parker
N. F. Matthews
Inventor
Leonard Herweyer.
By James J. Sheehy.
Attorney

UNITED STATES PATENT OFFICE.

LEONARD HERWEYER, OF VOGEL CENTRE, MICHIGAN.

BARBED-WIRE FENCE.

SPECIFICATION forming part of Letters Patent No. 517,548, dated April 3, 1894.

Application filed April 21, 1892. Serial No. 430,039. (No model.)

*To all whom it may concern:*

Be it known that I, LEONARD HERWEYER, a citizen of the United States, residing at Vogel Centre, in the county of Missaukee and State of Michigan, have invented certain new and useful Improvements in Barbed-Wire Fences; and I do declare the following to be a full, clear, and exact description of the invention, such as will enable others skilled in the art to which it appertains to make and use the same.

This invention has relation to an improvement in that class of barbed fences in which pendants are used and designed to be kept in motion by the atmosphere or other cause so as to prevent the danger of cattle cutting and injuring themselves by running against the barbs, and the novelty will be fully understood from the following description and claim when taken in connection with the annexed drawings, in which—

Figure 1, is a front elevation of a section of barb fence provided with my improvements. Fig. 2, is a view of one of the small plates which are employed at points intermediate of the large plates. Fig. 3, is a cross sectional view of the runners showing the loop wires terminating in barbs for suspending the plates, and Fig. 4, is an enlarged front view of a double runner, and plate and barbs in position.

Referring by letter to said drawings: A, indicates the fence posts and B, the runners of any ordinary barb fence. The top runner B', is designed to be formed of two strands twisted together as better shown in Fig. 4, of the drawings, although it is obvious that in some cases it may be a single wire.

C, indicates one of the pendent plates. As it is desirable that these plates should be readily seen by cattle it is essential that they should be attractive as in some cases where pendants have been employed they have been of such little benefit that cattle run against the fences and tear themselves with the barbs before seeing the pendants. For this reason it is desirable that while preserving as much beauty as possible for the fence, the pendant should be of such a form as to keep them continually dangling or swinging and make them as noticeable as possible for the cattle. With a view of economy in material and effectiveness I have provided these pendants C, of approximately crescent shape as shown, and connect them at each end in a depending manner so that the broad sides will be presented to the action of the wind, and thereby keep them continually in a swinging motion. By having the pendants continually swinging there is a constant friction and wear upon the runners and the loop wires connecting them which in some cases have been known to cut the runners. This objection I overcome by presenting a broad bearing between the connecting wires and the runners, by coiling such wires a number of times around the twisted strands as better shown in Fig. 4, of the drawings. The pendants C, are provided near opposite ends with holes $a$, and through these holes are passed the wires B, which are formed in loops as shown at $b$. These wires after receiving the pendants and making the loops $b$, are coiled around the runners as shown at $d$, and on opposite sides of said loop $b$, and are terminated in barbs $c$, so that the loops are fixed to the runners and the pendants allowed to swing freely. By the provision of the loops $b$, it will be seen that the pendants are allowed to swing on said loops without moving the same; and it will also be perceived that the loops will not be moved with respect to the runners, except when a high wind is blowing which is advantageous for the reason that a constant movement of the wires D, on the runner tends to wear the same and in time causes it to part. I have found that this form of plate is the most effective for the purpose and combines strength and cheapness.

With a view of enhancing the beauty of the fence, I provide the top runner at points beneath the pendants C, with small pendants E, which may be of a shield shape, as shown. These small pendants are also suspended from the runner by a wire which may have barbs and which are allowed to swing freely. These pendants may be of sheet metal or other suitable material and as it is desirable that they should present a bright appearance they may be painted white or made otherwise attractive.

In addition to enhancing the appearance of the fence, the small pendants E, arranged alternately with respect to the large pendants, serve to render the fence more noticeable, inasmuch as they will be set in motion and caused to flash the light, by a breeze or air current, which would not set the large pendants in motion. Furthermore when a breeze, strong enough to oscillate the large pendants, is blowing, the small pendants will be moved to a greater extent than the large ones, so that the attention of an animal will be undoubtedly attracted.

I am aware of Patent No. 249,777, dated November 22, 1881, in which tags are arranged upon the runners of barbed wire fences; which tags are formed from sheet metal having a projection at one corner bent over upon the body to form a spring hook which is designed to clamp the runners and allow the tag to oscillate thereon. I am also aware of Patent No. 405,851, dated June 25, 1889, in which tags are also formed from sheet metal coated with phosphorus, and having the upper end of the body bent over upon itself to form a loop, and such bent branch secured by a rivet or the like so as to form an eye to receive the barbed wires, and I am furthermore aware of Patent No. 266,545, dated October 24, 1882, in which tags are employed with a notched head or upper end to receive an embracing wire, which is secured to the runner or fence wire and has its ends terminating in barbs. This latter patent also has the tags provided with an eye or hole to receive a securing wire which has its ends terminating in barbs, and I therefore do not claim any of these constructions broadly, but, Having described my invention, what I claim is—

The improved fence described, consisting essentially of posts and barbed wires, the top runners, the crescent shaped plates, having the holes at opposite ends, the wires D, passing through said holes and forming a loop $b$, and thence coiled around the runners a number of times as shown at $d$, and terminating in the barbs $c$, on opposite sides of the loops $b$, and the small plates E depending from the runners at points intermediate of the large plates of crescent shape, all adapted to serve, substantially as and for the purpose specified.

LEONARD HERWEYER.

Witnesses:
BEULAH MORSMAN,
ORLANDO MORSMAN.